(12) United States Patent
Schmidt et al.

(10) Patent No.: US 9,075,671 B2
(45) Date of Patent: Jul. 7, 2015

(54) OPERATING SYSTEM AND ARCHITECTURE FOR EMBEDDED SYSTEM

(71) Applicant: Hamilton Sundstrand Corporation, Rockford, IL (US)

(72) Inventors: Jeffrey S. Schmidt, Rockton, IL (US); Mark E. Jenkinson, Winnebago, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/300,475

(22) Filed: Jun. 10, 2014

(65) Prior Publication Data
US 2014/0298357 A1 Oct. 2, 2014

Related U.S. Application Data

(63) Continuation of application No. 10/991,743, filed on Nov. 18, 2004, now Pat. No. 8,789,051.

(51) Int. Cl.
*G06F 9/46* (2006.01)
*G06F 9/54* (2006.01)
*G06F 9/48* (2006.01)

(52) U.S. Cl.
CPC .............. *G06F 9/546* (2013.01); *G06F 9/4887* (2013.01); *G06F 9/544* (2013.01)

(58) Field of Classification Search
None
See application file for complete search history.

(56) References Cited

U.S. PATENT DOCUMENTS

| | | |
|---|---|---|
| 5,210,872 A | 5/1993 | Ferguson et al. |
| 5,303,369 A | 4/1994 | Borcherding et al. |
| 5,325,526 A | 6/1994 | Cameron et al. |
| 5,887,143 A | 3/1999 | Saito et al. |
| 5,915,252 A | 6/1999 | Misheski et al. |
| 5,961,585 A | 10/1999 | Hamlin |
| 6,076,157 A | 6/2000 | Borkenhagen et al. |
| 6,110,220 A | 8/2000 | Dave et al. |
| 6,112,023 A | 8/2000 | Dave et al. |
| 6,117,180 A | 9/2000 | Dave et al. |
| 6,151,538 A | 11/2000 | Bate et al. |
| 6,212,544 B1 | 4/2001 | Borkenhagen et al. |
| 6,247,109 B1 | 6/2001 | Kleinsorge et al. |
| 6,345,287 B1 | 2/2002 | Fong et al. |
| 6,470,397 B1 | 10/2002 | Shah et al. |
| 6,490,611 B1 | 12/2002 | Shen et al. |
| 6,567,839 B1 | 5/2003 | Borkenhagen et al. |
| 6,567,840 B1 | 5/2003 | Bnns et al. |
| 6,633,916 B2 | 10/2003 | Kauffman |
| 6,813,527 B2 | 11/2004 | Hess |
| 6,871,350 B2 | 3/2005 | Wong et al. |
| 7,076,634 B2 | 7/2006 | Lambeth et al. |
| 7,140,022 B2 | 11/2006 | Binns |
| 7,380,039 B2 | 5/2008 | Miloushev et al. |
| 2002/0091863 A1* | 7/2002 | Schug ............................ 709/250 |
| 2003/0009508 A1 | 1/2003 | Troia et al. |
| 2003/0131042 A1 | 7/2003 | Awada et al. |
| 2003/0154234 A1 | 8/2003 | Larson |
| 2004/0078799 A1 | 4/2004 | Koning et al. |
| 2005/0097035 A1 | 5/2005 | Likas et al. |
| 2006/0101473 A1 | 5/2006 | Taylor et al. |

* cited by examiner

*Primary Examiner* — Gregory A Kessler
(74) *Attorney, Agent, or Firm* — Carlson, Gaskey & Olds, P.C.

(57) ABSTRACT

An operating system for an aircraft according to an exemplary aspect of the present disclosure includes, among other things, a core services layer and a hardware interface layer that is time and space partitioned from the core services layer. The hardware interface layer is operable to control communications with hardware in a computer.

22 Claims, 7 Drawing Sheets

OPERATING SYSTEM AND ARCHITECTURE FOR EMBEDDED SYSTEM

CROSS-REFERENCE TO RELATED APPLICATIONS

This application is a continuation of U.S. application Ser. No. 10/991,743, filed Nov. 18, 2004.

BACKGROUND

The present invention relates generally to operating systems and architecture and more particularly to an operating system and run-time architecture for safety critical systems.

Aircraft systems are subject to functionality restrictions and the verification requirements specified in the RTCA/DO-178B (DO-178B) Standard, "Software Considerations in Airborne Systems and Equipment Certification." The Federal Aviation Authority in conjunction with its world wide counterparts recognizes and enforces adherence to this standard. In the RTCA/DO-178B standard, there are three concepts of interest defined, the first being "Levels of software criticality," the second concept being protection, and the third, which is closely related to the second is the concept of partitioning.

Software levels of criticality, as defined in the DO-178B standard, are defined as five differing levels (e.g. Levels A, B, C, D, E), where Level A represents software of the highest criticality and Level E the lowest in terms of the software's function in controlling safety critical function on the aircraft. Thus the standard provides a method to classify high criticality functions and tasks from lower level criticality functions and tasks. Safety critical standards from other industries may define this concept similarly.

The DO-178B standard defines partitioning as the separation of software levels of criticality in both time and space running on a single CPU. Thus a partitioned design provides both Time Partitioning and Space Partitioning. Time Partitioning is the ability to separate the execution of one task from another task, such that a failure in one task will not impede the execution of the other. Space Partitioning is defined as the separation of execution space for two partitions, such that one partition cannot corrupt the other partition's memory (space), or access a critical resource. The DO-178B standard defines protection as the protection of one partition from another partition, such that a violation of either time or space in a partition has no effect on any other partition in the system.

Many existing task analysis and scheduling techniques exist in real-time preemptive operating systems today. One method of interest is Deadline Monotonic Analysis (DMA) and Scheduling (DMS) (reference Embedded Systems Programming see "Deadline Monotonic Analysis," by Ken Tindell, June 2000, pp. 20-38). Deadline Monotonic Analysis (DMA) is a method of predicting system schedule-ability where the system is a CPU with multiple tasks that are to be executed concurrently. DMA requires that the analyst have the following basic information for every task to be scheduled in the system: 1) Task period, the task cycle or rate of execution. 2) Task Deadline, the time that the task must complete execution by as measured from the start of a task period. 3) The task's worst case execution time (WCET), the worst-case execution path of the task in terms of instructions converted to time. Armed with this basic information the analyst can use the DMA mathematics or formulas to predict if the system can be scheduled, i.e. whether all tasks will be able to meet their deadlines in every period under worst case execution scenarios. If the system can be scheduled then the system can be executed using a runtime dynamic compliant Deadline Monotonic Scheduler (DMS).

Existing Deadline Monotonic Schedulers use a dynamic method for determining individual task execution at runtime. At each timing interval, an evaluation is made at run-time to determine whether the currently executing task is to be preempted by a higher priority task, or whether a new task is due to be started on an idle system. This dynamic method achieves the goals of schedule-ability, but does introduce an element of variability, since the individual preemption instances and task initiation times may vary over successive passes through the schedule. For example, in an existing Deadline Monotonic Scheduler, individual task execution may be "slid" to an earlier execution time if the preceding task finishes early or aborts. Also, the number and placement of preemptions that take place are similarly affected, and so individual tasks may vary anywhere within the bounds defined by their DMS parameters.

Even though the amount of variability in existing Deadline Monotonic Schedulers is limited to the schedule parameters, it is nevertheless undesirable for certain applications where a higher degree of predictability and repeatability is desired, for example, DO-178B (avionics) and other safety critical applications.

In a partitioned design, tasks inside of one partition communicate data via Application Programming Interfaces (APIs) or APplication/EXecutive (or APEX) as they are called in ARINC 653 compliant designs. The RTCA/DO-178B standard concept of protection requires that partitions be protected from each other such that a violation of either time or space in partition has no effect on any other partition in the system. This concept of protection applies to the APIs or APEX interfaces as well.

In ARINC 653 compliant designs, partitions are given access to the APEX interface during the partition's window of execution. During this window, a partition can request or send data to any resource available in the system via calls to the appropriate APEX interface.

In the case of the ARINC 653 compliant designs, all partitions have access to all of the APEX interfaces to request or send information. Thus, the standard has no concept for restricted use or protected services or restricted interfaces. Thus, it is possible for one partition to overload or corrupt any APEX interface or associated service such that the service is not available during the next partitions window of execution. This limitation does not support the protection criteria required by DO-178B in partitioned designs.

Many safety critical industries like aviation provide regulatory guidelines for the development of embedded safety critical software. Adherence to safety critical software design standards involves creation of design and verification artifacts that must support and prove the pedigree of the software code in its particular application and assessed software criticality level.

Adherence to these safety critical standards typically means that designers will spend less than 20% of their time producing the actual code, and greater than 80% producing the required supporting artifacts, and in some cases the time spent producing the code can enter the single digits.

While adherence to these standards is meant to produce error-free embedded software products, the cost associated with the production of these products is high. As a result, the producers seek as much reuse as possible. Due to the critical nature of these products in the industries that they serve, the safety critical standards also provide guidance for reuse.

The reuse guides typically state that a software configuration item can be reused without additional effort if it has not changed, implying that its artifacts have not changed in addition to the code.

Today, only one standard exists for a partitioned software design in the safety critical world of avionics. That standard is the ARINC 653 standard. The ARINC 653 standard supports application partitions that could be reused across multiple applications. Since the standard provides a common APEX or user interface to the Operating System functions, it is possible to write an application that utilizes the specified APEX interface. If an application can be written using the standards specified for APEX interface calls only, then if properly developed, the applications artifacts and code would not change from product to product.

One of the flaws with the ARINC 653 approach is that the underlying system hardware, like on aircraft avionics communications protocols and/or other product or system hardware devices, can and will change from program to program (or aircraft to aircraft). In addition, most aircraft OEM's change aircraft specifications from aircraft to aircraft which puts application software reuse at risk.

In summary, existing safety critical operating systems contain many noticeable drawbacks, among these are the following:

1) They do not ensure that the individual tasks grouped within a partition will be individually time partitioned.

2) They do not provide the flexibility to space partition multiple tasks of the same criticality either individually or in subgroups.

3) The architecture requires the operating system to provide all Application Programming Interfaces (API's) or APEX's in the case of ARINC 653, to all partitions.

4) Access to system hardware or CPU resources is provided by the operating system via the API (or APEX in the case of ARINC 653), thus the interface for these resources is controlled by the operating system, and could change from platform to platform, limiting the ability to reuse software without change.

5) The architecture and API or APEX interfaces provide no mechanism for exclusive use of critical resources by a partition, the concept of protected resources.

6) The architecture and API or APEX interfaces are open to use by any caller and as such does not provide protection for each partition.

7) Runtime dynamic compliant Deadline Monotonic Schedulers do not limit task execution variability.

SUMMARY

An operating system for an aircraft according to an exemplary aspect of the present disclosure includes an application layer and a core services layer that is time and space-partitioned from the application layer. A hardware interface layer, being time and space-partitioned from both the application layer and the core services layer, is operable to control communications with hardware in a computer.

An operating system for an aircraft according to another exemplary aspect of the present disclosure includes a plurality of core services and a plurality of application specific services that are time and space-partitioned from the core services. The core services are common across multiple platforms. The application specific services are specific to one of the multiple platforms, such that the application specific services can be modified without altering the core services. A hardware interface layer is time and space-partitioned from both the core services and the application specific services. The hardware interface layer is operable to control communications with hardware in a computer.

BRIEF DESCRIPTION OF THE DRAWINGS

Other advantages of the present invention can be understood by reference to the following detailed description when considered in connection with the accompanying drawings wherein.

DETAILED DESCRIPTION

Figure 1:
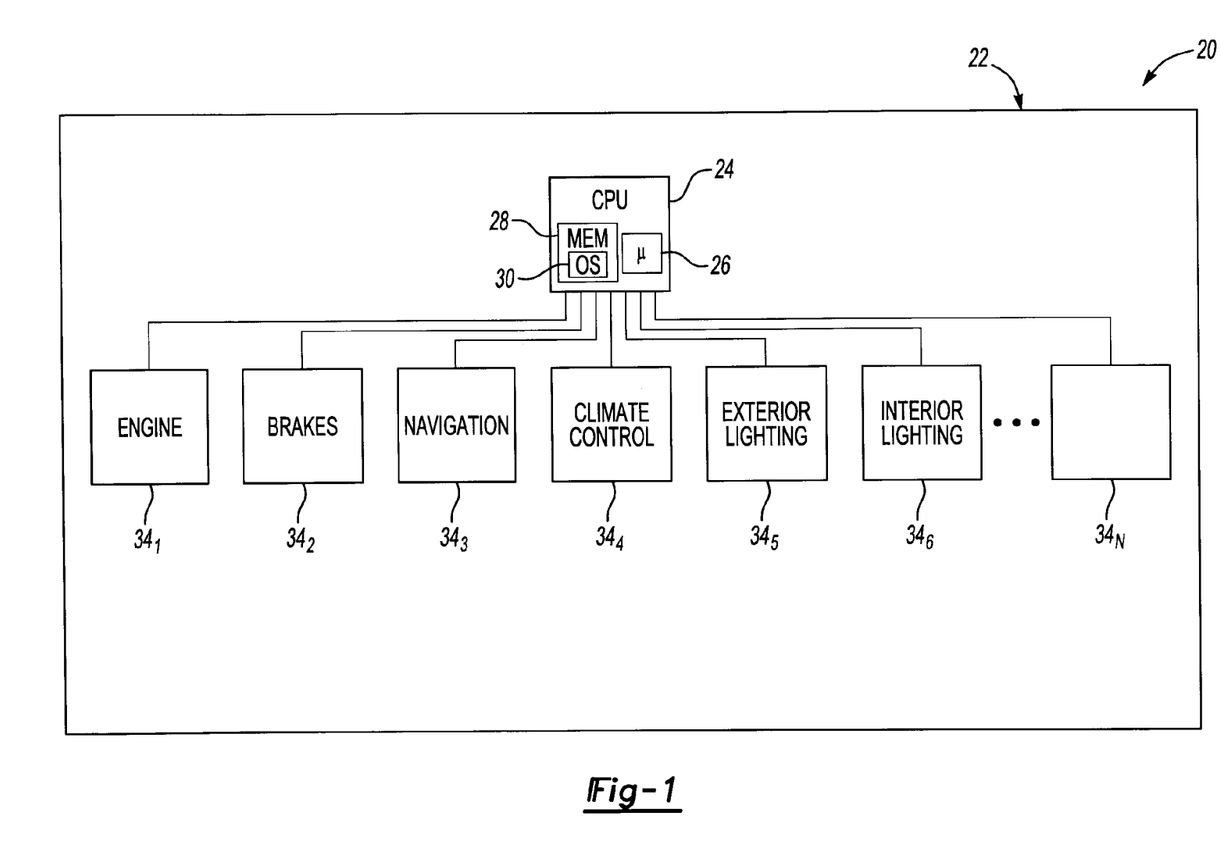
FIG. 1 is a high level schematic of a control system, shown controlling systems of an aircraft.

FIG. 1 schematically illustrates a control system 20 installed and in use in an aircraft 22. The control system 20 includes a CPU 24 having a processor 26 and memory 28 storing an operating system 30 and other software for controlling the functions of the aircraft 22, including the engine $34_1$, brakes $34_2$, navigation $34_3$, climate control $34_4$, exterior lighting $34_5$, interior lighting $34_6$ and other functions (up to function $34_N$). The memory 28 could be RAM, ROM and may be supplemented by a hard drive or any other electronic, magnetic, optical or any other computer readable media.

Figure 2:
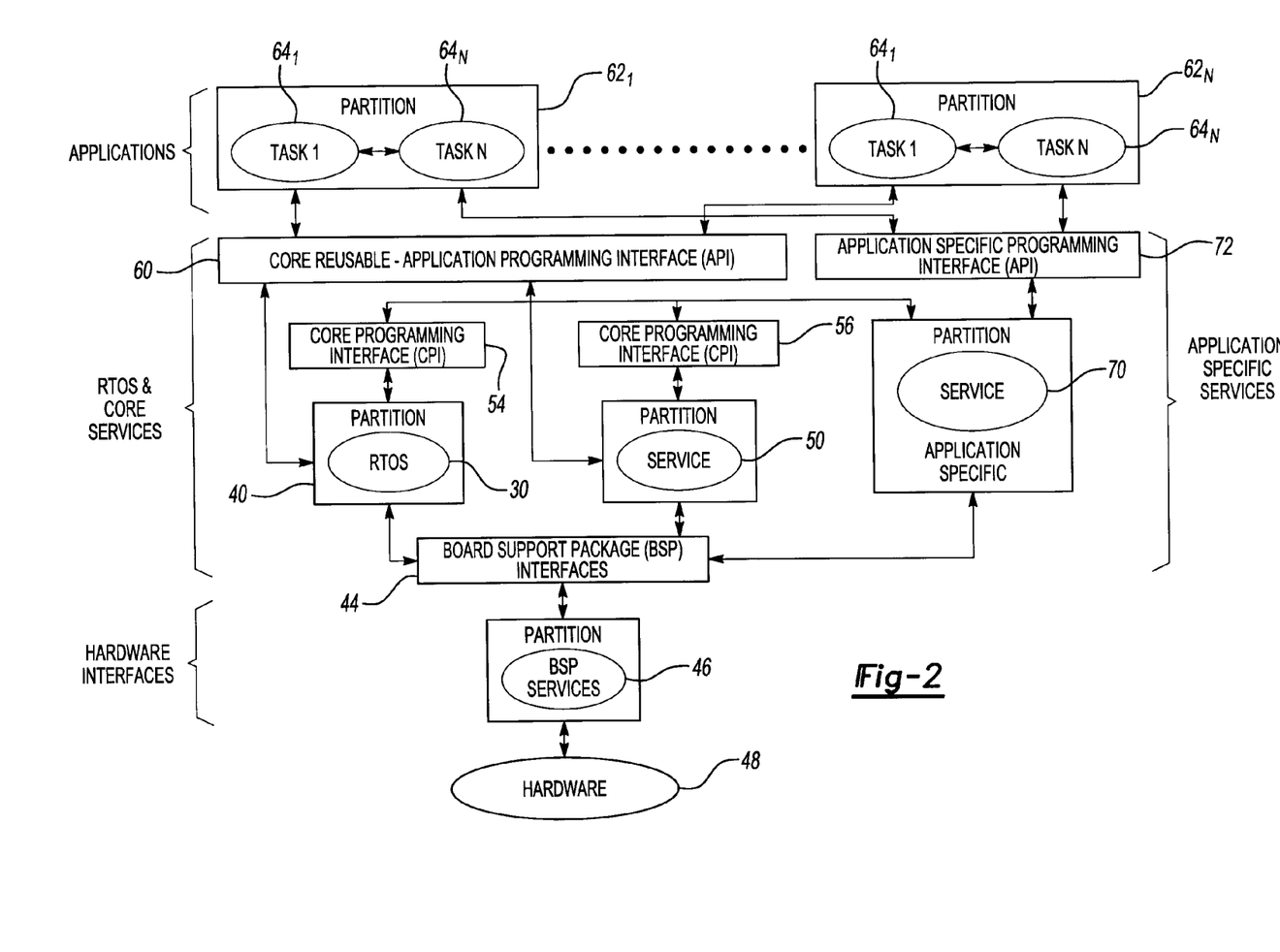
FIG. 2 is a schematic of the architecture of the control system.

FIG. 2 schematically illustrates the architecture of the control system of FIG. 1. The operating system 30 is within its own partition 40 and communicates with board support package (BSP) interfaces 44, which communicates with BSP services 46, for interfacing with hardware 48. Core support services 50 (one shown), each in its own partition, also communicate with the BSP interfaces 44. The operating system 30 and core support services 50 communicate with one another and the application specific service 70 via core programming interfaces 54, 56. The operating system 30 and core support services 50 communicate with the core reusable application programming interface (API) 60 for interfacing with a plurality of application partitions $62_1$ to $62_N$, each containing a plurality of tasks $64_1$ to $64_N$. The application specific service 70 also communicates with the partitions 62 via an application specific programming interface 72.

The application tasks $64_1$-$64_N$ in each partition 62 run in user mode and are certified to the level of criticality required by function hazard assessment and system safety assessment. The application tasks 64 can have their own partitions 62 or can share a partition 62 with one or more tasks 64 of the same criticality level, as shown. The application tasks 64 interface with the application specific support services 70, core support services 50 and the operating system 30 through the APIs 60, 72. It should be noted that the application tasks 64 do not interface with the hardware 48 directly. The core support service 50 and application specific support service 70 run in user mode, while the operating system 30 runs in supervisor mode.

The tasks within the core support service 50 can each have their own unique partitions or can share a partition with one or more core support services of the same criticality level. The tasks within the core support services 50 interface with the application tasks 64, other application specific support services 70, operating system 30 and the BSP services 46 through APIs 60, 72, 44.

The application specific support services 70 module contains tasks that run in user mode. The services 70 are reserved for services that change from aircraft to aircraft. The application specific support services 70 tasks are certified to a level of criticality required by functional hazard assessment and system safety assessment. Application specific support service 70 tasks can have their own unique partitions or can share a partition with one or more tasks of the same criticality level. The tasks in each application specific support service 70 interface with the applications 64, core support services 50, operating system 30, and the BSP services 46 through APIs 60, 72 and 44. The tasks in the BSP services 46 run in user mode. The interfaces will be particular to the product's hardware interfaces. The hardware interfaces can either be tasks or device drivers. Tasks can have their own unique partitions or can share a partition of one or more tasks of the same criticality level (hardware access and partition needs must be considered). Device drivers can be called by any task in any partition to read data without delay. Device drivers can handle writing to hardware I/O, if an exclusive device driver (one per task). The BSP services 46 interface with the core support services 50 application specific support services 70 and operating system 30 through BSP interfaces 46.

Figure 3:
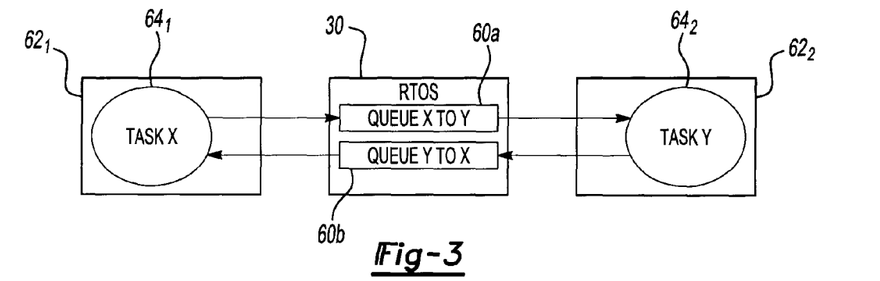
FIG. 3 illustrates the operation of the message queues in FIG. 2 generally.

The APIs comprise two types: message queues and device drivers. Referring to FIG. 3, the message queues 60a-b (only two shown for purposes of illustration) can have fixed length messages or variable length messages and provide communication across partitions. The message queues 60a-b pass multiple messages between an application task 64 in one partition $62_1$ and an application task 64 in another partition $62_2$. Message queues are controlled by the RTOS 30 (in terms of size, shape, access, etc) and are implemented using system calls. Each message queue 60a-b is dedicated to sending messages from one specific task 64 to another specific task 64 in a single direction. Each queue 60a-b has one task 64 as the sender and the other task 64 as the receiver. If the two tasks 64 require handshaking, then two queues must be created, such as in the example shown. Message queue 60a sends messages from task $64_1$ to task $64_2$ while message queue 60b sends messages from task $64_2$ to task $64_1$. Each task 64 has a queue 60 for each of the tasks 64 to which it has to send data and a queue 60 for each of the tasks 64 from which it has to receive data.

Figure 4:
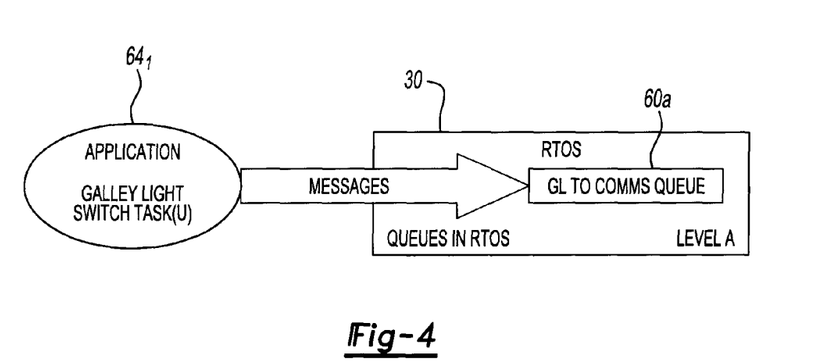
FIG. 4 illustrates a first step in the operation of the message queues of FIG. 3.
Figure 5:
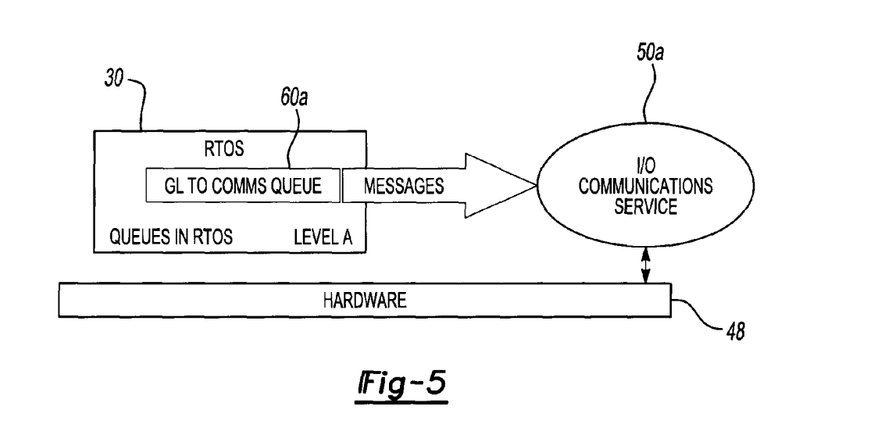
FIG. 5 illustrates a first step in the operation of the message queues of FIG. 3.

Referring to FIG. 4, in use, a sending task $64_1$ (such as the "galley light switch task") copies its message to the queue 60a ("galley light to communications" queue), which resides in the RTOS 30 during its task slot. Referring to FIG. 5, I/O communications services 50a is one of the services 50 shown generically in FIG. 2. During its task slot, the receiving task, I/O communications services 50a (in this example), copies the message from the queue 60a. In this example, the I/O communications services 50a would then map the output data to the hardware 48 (via BSP Interfaces 44 of FIG. 2, not shown in FIG. 5).

Figure 6:
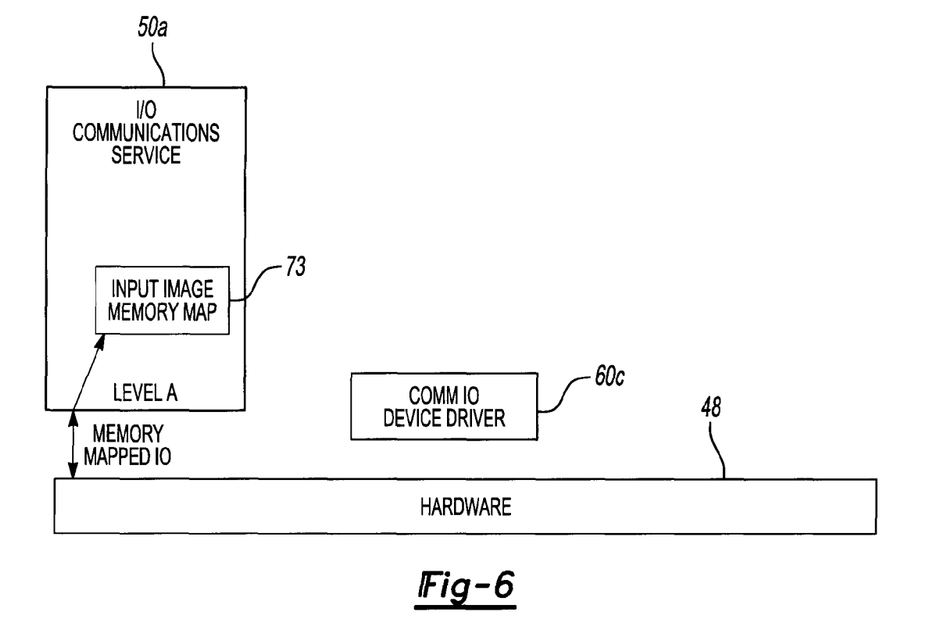
FIG. 6 illustrates a first step in the operation of the device drivers of FIG. 2.
Figure 7:
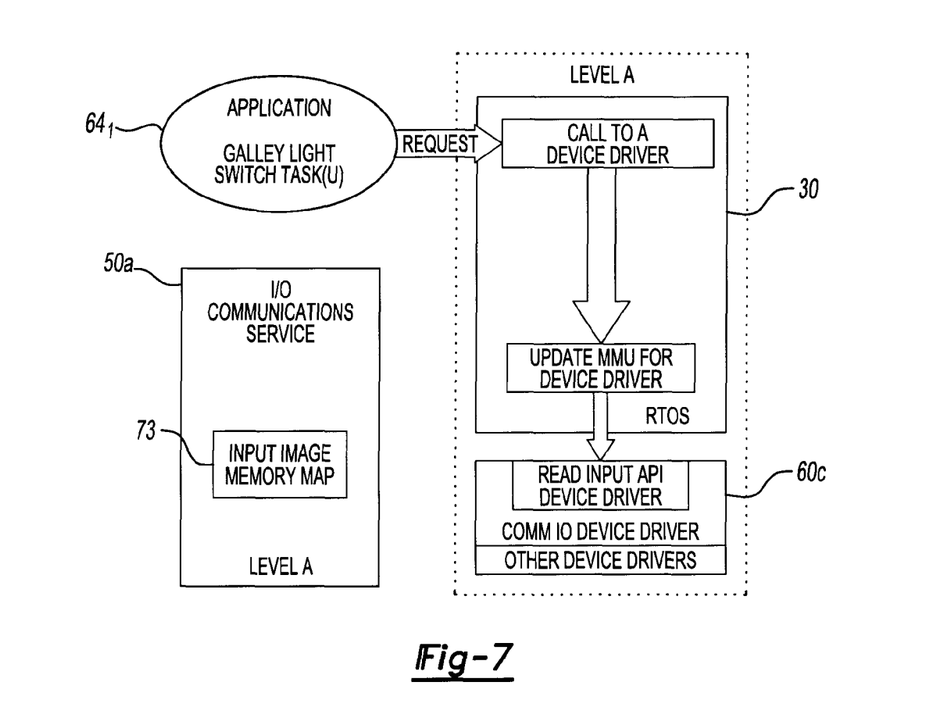
FIG. 7 illustrates a second step in the operation of the device drivers of FIG. 6.
Figure 8:
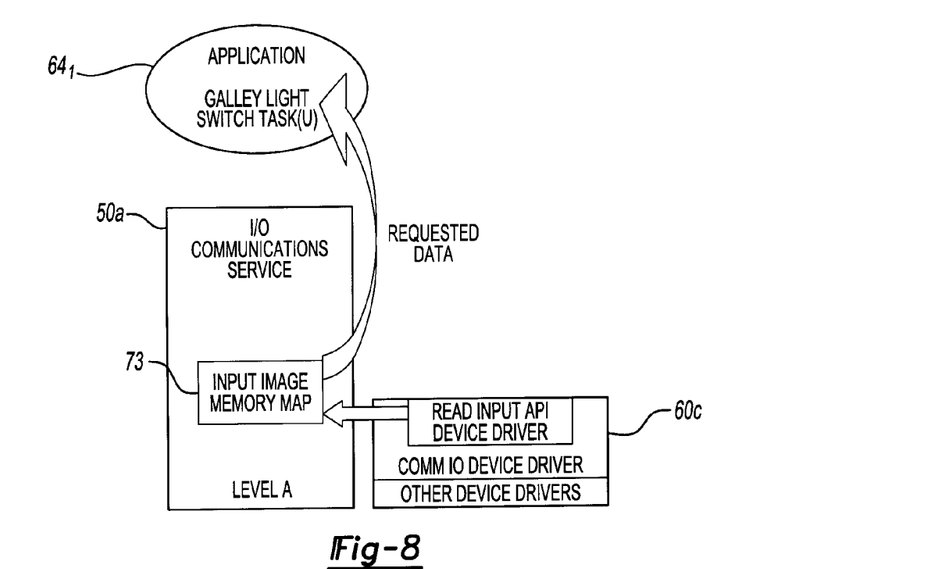
FIG. 8 illustrates a third step in the operation of the device drivers of FIG. 6.
Figure 9:
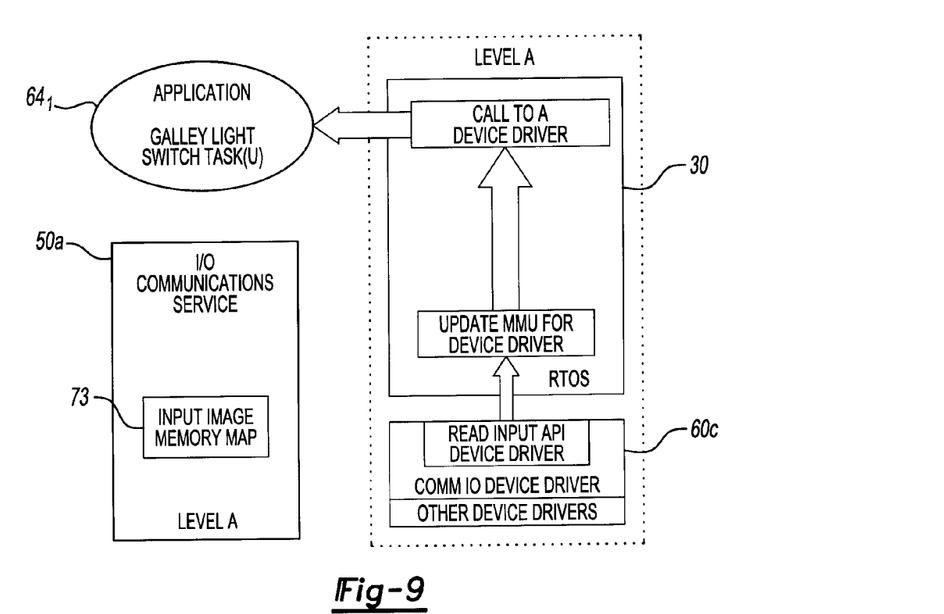
FIG. 9 illustrates a fourth step in the operation of the device drivers of FIG. 6.

Referring to FIG. 6, device drivers (one device driver 60c is shown) can also be used to read information between task partitions 62. Device drivers 60c have a single entry point and are re-entrant and pre-emptive. The device drivers 60c are implemented using system calls and there is no data delay. The device drivers 60c are operated in supervisor mode by the RTOS and can traverse space partitions. The I/O communications services 50a retrieves inputs from hardware 48 during its period of execution and places an image of the data into a memory map 73. As shown in FIG. 7, a task $64_1$ (in this example again, the "galley light switch task") requests the communication I/O device driver 60c. The request is handled in the RTOS 30 executing in supervisor mode. RTOS 30 adds code and data partition to the MMU for the device driver 60c. Execution is then placed in user mode and the device driver 60c is invoked. Referring to FIG. 8, the communication I/O device driver 60c executes with memory that is partitioned for both the galley light switch task $64_1$ and the I/O communications services 50a. The device driver 60c copies the requested inputs into the galley light switch data partition. Referring to FIG. 9, when the device driver 60c is finished, execution returns to the RTOS 30 in supervisor mode. The RTOS 30 removes the code and data partition from the MMU for the device driver 60c. Execution is then returned to the requesting task $64_1$ and the total execution time required to run the device driver 60c is charged to the requesting task $64_1$.

Figure 10:
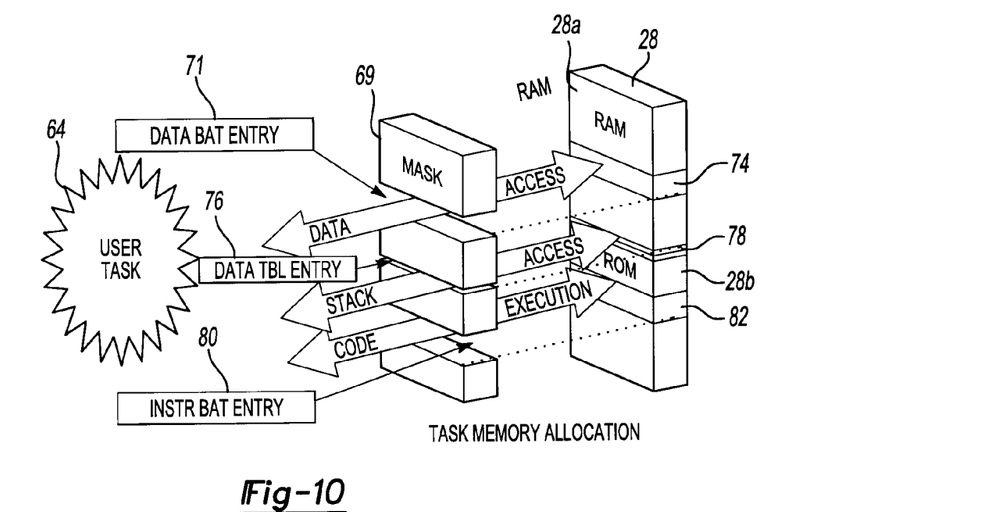
FIG. 10 conceptually illustrates the space partitioning of the control system.

The space partitioning is illustrated conceptually in FIG. 10. A mask 69 is defined by Block Address Translation (BAT) registers 71, 76, 80, and is used for space partitioning. For example, a task 64 is assigned data BAT entry 71, which defines a partition 74 in RAM 28a of memory 28, for example. Transition lookaside buffer (TLB) 76 defines a partition 78 in RAM 28a for task 64. Further, instruction BAT entry register 80 defines partition 82 in ROM of memory 28b of memory 28.

Tasks 64 are assigned to a partition 74, 78 and 82. Every task 64 switch loads in the predefined registers 71, 80 of the partition that task 64 belongs to. No searches are required if a BAT miss is encountered. The miss is a space partitioning fault. The transition lookaside buffer 76 on chip page table registers are used for stack protection. No searches are required if a TLB miss occurs. The miss is a space partitioning fault. The BAT registers 71, 80 are defined at compile time. All registers can be used for designer to allocate. The last register is multiplexed with a device driver. For communication, all tasks 64 can write to the last register.

For the instruction BATs 80, the first register is assigned to the operating system API instruction area (function call). The second to the last registers can be used for a designer to allocate. The last register is multiplexed with a device driver. Switching tasks requires first a check that a Single Event Upset (SEU) did not occur in the BAT registers. Then the BAT registers 71, 80 are updated with the new tasks 64 partition BAT values. The system then checks that the SEU did not occur for the TLB registers for the stacked protection. The current TLB registers are invalidated for the current task 64 and the TLB registers 76 are updated with the new tasks 64 values.

Figure 11:
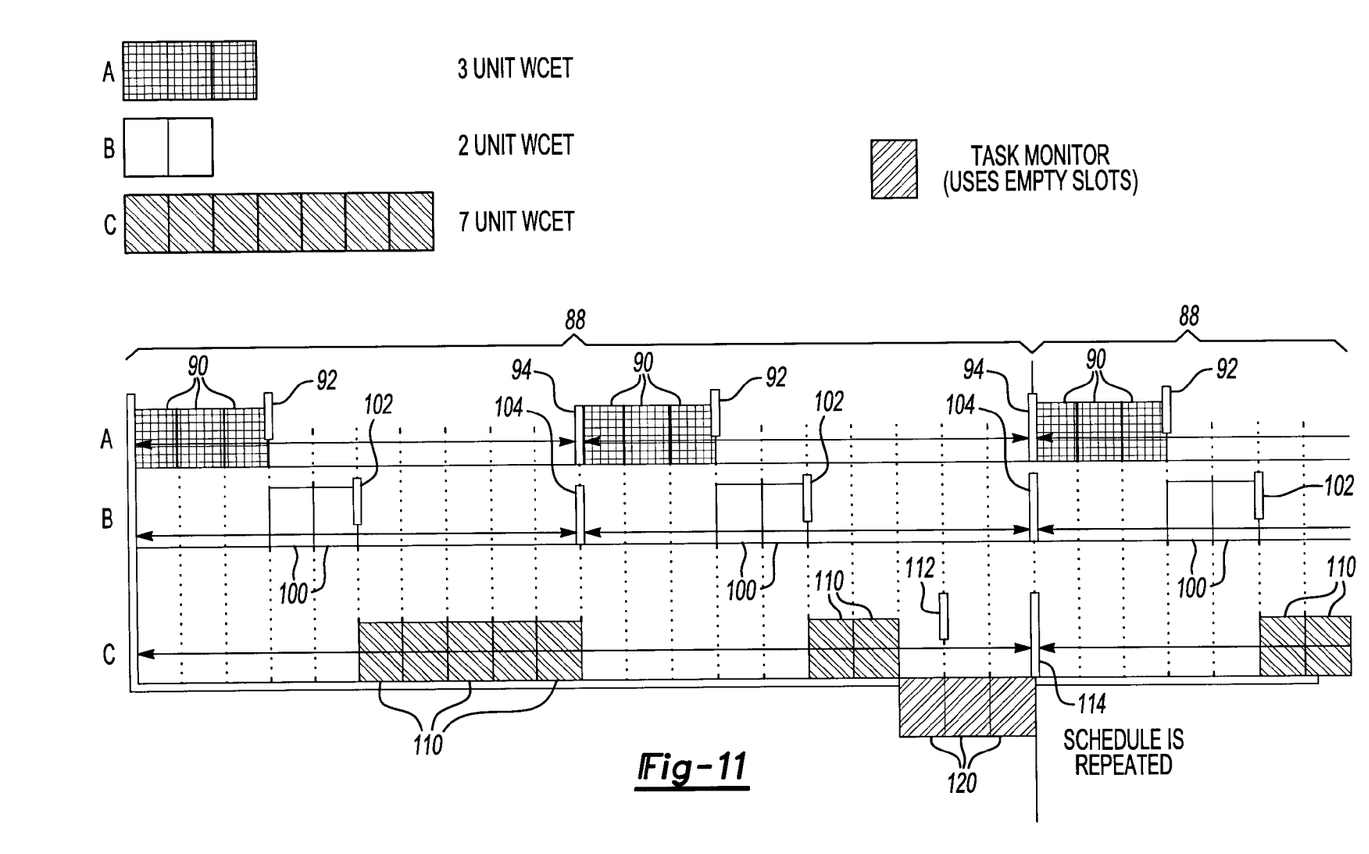
FIG. 11 illustrates the method of scheduling used in the control system.

FIG. 11 illustrates an example of the method of scheduling used in the control system. The example consists of Tasks A, B and C. In the example, Task A has a 3-unit WCET, a deadline of 3 units and a period of 10 units. Task B has a 2-unit WCET, a deadline of 5 units and a period of 10 units. Task C has a 7-unit WCET, a deadline of 18 units and a period of 20 units. Using the deadline monotonic algorithm, the repeating schedule 88 is created as shown. The three Task A execution blocks 90 are scheduled before the Task A deadline 92 (of 3 units) during every Task A period 94 (of 10 units). The two Task B execution blocks 100 are scheduled before the Task B deadline 102 (of 5 units) during every Task B period 104 (of 10 units). The seven Task C execution blocks 110 are scheduled before the Task C deadline 112 (of 18 units) during every Task C period 114 (of 20 units). The seven Task C execution blocks 102 are distributed such that five of the execution blocks 102 are during what corresponds to the one period 94, 104 of Tasks B and C, and two are during what corresponds to another period 94, 104 of Tasks B and C. This leaves three unused execution blocks 120, which may then be used for the task monitoring function.

Figure 12:
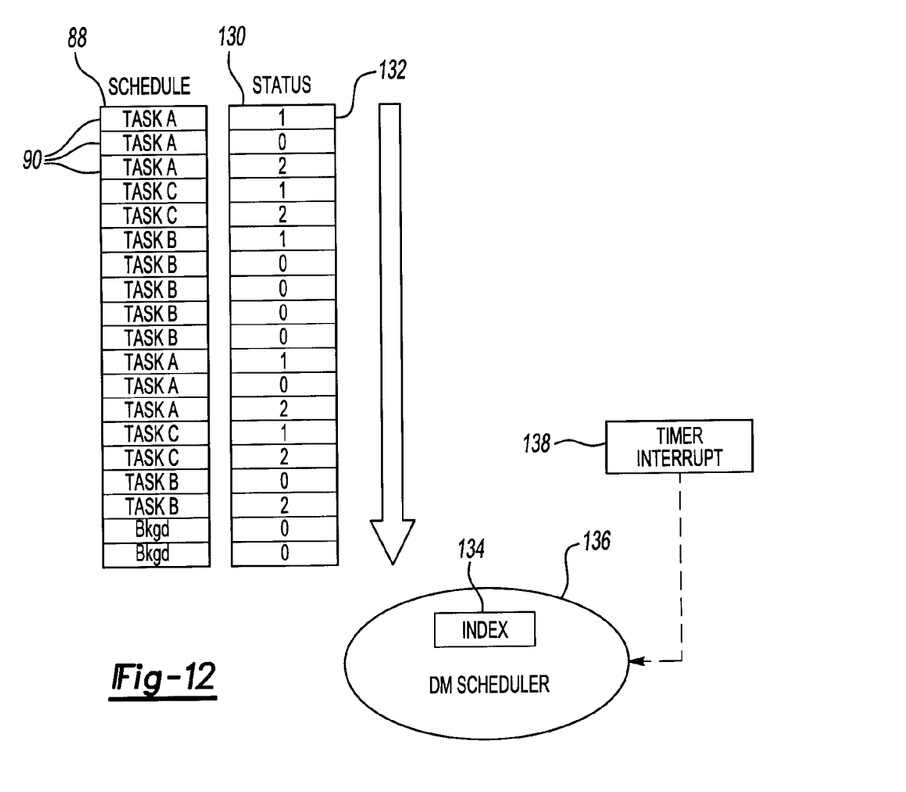
FIG. 12 illustrates the operation of the schedule for use in the control system.

Referring to FIG. 12, the schedule 88 does not change during operation. For example, the first three execution blocks 90 are always for Task A, even if A should terminate or fail. A status register 130 has a plurality of registers 132 that each correspond to the time blocks in the schedule 88. The status register 130 indicates the expected operation of the task associated with that particular status register 130. For example, the "1" may mark the beginning of a task for restarting the task. The "0" may signify that the Task may continue executing. The "2" indicates that the Task should end. An index 134 of the deadline monotonic scheduler 136 is incremented at each timer interrupt 138. The index 134 indicates which execution block in the schedule 88 is currently being performed.

The DM scheduler 136 ensures that no task can starve or block another task, because the DM scheduler 136 will only give each task the exact execution blocks that are allotted it in the schedule 88. Therefore, if Task A, for example, fails to complete before the third execution block, where the status register 132 of "2" indicates that the Task A should end, Task A is terminated, put to sleep or restarted. In the fourth execution block, Task C begins on schedule. If necessary, the entire control system 20 may be restarted.

A new schedule can be inserted when the index 134 reaches the end of the current schedule 88. The index 134 is then set to the beginning of the new schedule. For example, the system 20 may utilize a first, startup schedule for startup and another normal schedule for normal operation. The startup schedule may permit some of the various tasks more time to start up, with different WCETs, periods and deadlines. Once the system 20 is in full operation, the normal schedule may be seamlessly switched into operation.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. An operating system for an aircraft comprising:
    an application layer;
    a core services layer, being time and space-partitioned from the application layer; and
    a hardware interface layer, being time and space-partitioned from both the application layer and the core services layer, the hardware interface layer being operable to control communications with hardware in a computer, and at least one of the application layer, the core services layer and the hardware interface layer being stored in a memory storage device.

2. The operating system of claim 1, wherein the core services layer is a core services and application specific services layer including core services common across multiple vehicular platforms and application specific services that are specific to one of the multiple vehicular platforms.

3. The operating system of claim 2, wherein the application specific services include safety-critical applications tailored for the one of the multiple vehicular platforms.

4. The operating system of claim 2, wherein a second message queue provides communication only in a single direction, from a second task to a first task.

5. The operating system of claim 1, further including a first Application Programming Interface (API) for providing communication between the application layer and the core services layer.

6. The operating system of claim 5, further including a second Application Programming Interface (API) for providing communication between the core services layer and the hardware interface layer.

7. The operating system of claim 6, wherein the first API and the second API include message queues and device drivers.

8. The operating system of claim 7, wherein the message queues have fixed-length messages.

9. The operating system of claim 7, wherein the message queues have variable-length messages.

10. The operating system of claim 1, wherein the hardware is an aircraft avionics communications device.

11. An operating system for an aircraft comprising:
    a plurality of core services;
    a plurality of application specific services that are time and space-partitioned from each of the plurality of the core services, wherein the core services are common across multiple vehicular platforms and the application specific services are specific to one of the multiple vehicular platforms, such that the application specific services can be modified without altering the core services; and
    a hardware interface layer that is time and space-partitioned from both the core services and the application specific services, the hardware interface layer being operable to control communications with hardware in a computer, and at least one of the plurality of core services, the plurality of application specific services, and the hardware interface layer being stored in a memory storage device.

12. The operating system of claim 11, further including an application layer that is time and space-partitioned from the core services, from the application specific services and from the hardware interface layer.

13. The operating system of claim 11, wherein each of the plurality of core services have a single partition.

14. The operating system of claim 11, wherein the plurality of core services are in a plurality of partitions, and wherein each of the plurality of core services having the same criticality level is grouped into the same one of the plurality of partitions.

15. The operating system of claim 11, wherein the hardware is an aircraft avionics communications device.

16. The operating system of claim 1, comprising a real-time operating system that is time and space-partitioned from the hardware interface layer, the application layer and the core services layer.

17. The operating system of claim 16, wherein:
    the hardware interface layer includes a plurality of board support services configured to interface with the hardware and are accessible by board support package interfaces, the plurality of board support services in a plurality of partitions such that board support services having the same criticality level are grouped together in a single partition and board support services having a different criticality level are in a different one of the plurality of partitions; and the real-time operating system, the core services and the application specific services are configured to access the board support services by utilizing the board support package interfaces.

18. The operating system of claim 2, wherein the core services are in a plurality of partitions such that the core services having the same criticality level are grouped together in a single partition and core services having different criticality levels are in different partitions.

19. The operating system of claim 18, wherein:

the core services include a plurality of core tasks and the application specific services include a plurality of application specific tasks, each of the core and application specific tasks corresponding to functions of an aircraft.

20. A non-transitory computer-readable storage medium storing a program, where the program is configured to cause a processor to perform the steps of:

a) time and space-partitioning a plurality of application specific services from a plurality of core support services, the plurality of application specific services and the plurality of core support services corresponding to functions common across multiple aircraft platforms, the application specific services corresponding to functions specific to one of the multiple aircraft platforms such that the application specific services can be modified without altering the core support services;

b) time and space-partitioning a hardware interface layer from both the core support services and the application specific services, the hardware interface layer being operable to control communications with hardware in a computer;

c) time and space-partitioning a real-time operating system time from the plurality of application specific services, the plurality of core support services and the hardware interface layer; and d) time and space-partitioning an application layer from the plurality of application specific services, the plurality of core support services, the hardware interface layer and the real-time operating system time, each partition of the application layer being free of any operating system.

21. The non-transitory computer-readable storage medium of claim 20, wherein:

the hardware interface layer includes a plurality of board support services configured to interface with the hardware, the plurality of board support services in a plurality of partitions such that board support services having the same criticality level are grouped together in a single partition;

the real-time operating system, the plurality of core support services and the plurality of application specific services are configured to access the board support services by directly interfacing with a board support package interfaces; and the application layer is configured access the board support services by communicating with any of the real-time operating system, the plurality of core support services, and the plurality of application specific services by an Application Programming Interface (API) coupled to each of the real-time operating system, the plurality of core support services, and the plurality of application specific services.

22. The non-transitory computer-readable storage medium of claim 20, wherein the hardware includes an engine device, a brake device, a navigation device, a climate control device, an exterior lighting device and an avionics communications device each corresponding to the one of the multiple aircraft platforms.

* * * * *